United States Patent
Hench et al.

(10) Patent No.: US 10,870,592 B2
(45) Date of Patent: Dec. 22, 2020

(54) ELECTROSTATIC SEPARATOR

(71) Applicant: OneSubsea IP UK Limited, London (GB)

(72) Inventors: Andrew Jeremiah Hench, Katy, TX (US); John Joseph Byeseda, Houston, TX (US)

(73) Assignee: OneSubsea IP UK Limited, London (GB)

( * ) Notice: Subject to any disclaimer, the term of this patent is extended or adjusted under 35 U.S.C. 154(b) by 374 days.

(21) Appl. No.: 15/156,321

(22) Filed: May 16, 2016

(65) Prior Publication Data

US 2016/0332895 A1 Nov. 17, 2016

Related U.S. Application Data

(60) Provisional application No. 62/162,051, filed on May 15, 2015.

(51) Int. Cl.
| | |
|---|---|
| *C02F 1/469* | (2006.01) |
| *B01D 17/06* | (2006.01) |
| *B03C 11/00* | (2006.01) |
| *C02F 1/48* | (2006.01) |
| *B01D 17/02* | (2006.01) |
| *C10G 33/02* | (2006.01) |
| *C02F 1/463* | (2006.01) |
| *C02F 101/32* | (2006.01) |
| *C02F 1/40* | (2006.01) |

(52) U.S. Cl.
CPC .......... *C02F 1/469* (2013.01); *B01D 17/0211* (2013.01); *B01D 17/06* (2013.01); *B03C 11/00* (2013.01); *C02F 1/463* (2013.01); *C02F 1/48* (2013.01); *C10G 33/02* (2013.01); *B03C 2201/02* (2013.01); *C02F 1/40* (2013.01); *C02F 2101/32* (2013.01)

(58) Field of Classification Search
CPC ........ B01D 17/06; B01D 17/04; C10G 33/02; C02F 1/463
See application file for complete search history.

(56) References Cited

U.S. PATENT DOCUMENTS

| | | | | |
|---|---|---|---|---|
| 3,186,933 A | * | 6/1965 | Gupner | ................... B01D 17/06 204/666 |
| 3,672,127 A | * | 6/1972 | Mayse | ............... B01D 17/0208 204/662 |
| 3,914,175 A | * | 10/1975 | Kunz | ................... B01D 17/045 210/802 |
| 4,469,582 A | * | 9/1984 | Sublette | ................. C10G 33/02 204/666 |
| 5,643,469 A | * | 7/1997 | Prevost | .............. B01D 17/0217 210/787 |
| 2009/0159534 A1 | * | 6/2009 | Bjorklund | .............. B01D 17/06 210/708 |
| 2013/0327646 A1 | | 12/2013 | Sams et al. | |

* cited by examiner

*Primary Examiner* — Brian W Cohen
(74) *Attorney, Agent, or Firm* — Helene Raybaud

(57) ABSTRACT

An electrostatic separator including a separator vessel having an oil collection portion at its upper end, a water collection portion at its lower end, at least one electrode generating an electric field, and an inlet through which an emulsion mixture enters the separator vessel before exposure to the electric field in the upper part of the vessel, wherein the separator vessel further comprises at least one routing blade located proximate to the at least one electrode to route coalesced water droplets downwardly and away from the electric field.

14 Claims, 4 Drawing Sheets

ELECTROSTATIC SEPARATOR

CROSS-REFERENCE TO RELATED APPLICATIONS

This application claims the benefit of U.S. Provisional Application No. 62/162,051, filed on May 15, 2016, entitled "Electrostatic Separator" which is incorporated herein in its entirety for all purposes.

STATEMENT REGARDING FEDERALLY SPONSORED RESEARCH OR DEVELOPMENT

Not applicable.

BACKGROUND

The embodiments described herein relate generally to systems and methods for electrostatic coalescence of immiscible components from a mixture. More particularly, embodiments described herein relate to the separation of water from a water-in-oil mixture.

One of the world's most useful sources of energy is crude oil, derived from subterranean formations. When crude oil arrives at the earth's surface it is typically in the form of a water-and-oil mixture. That is, crude oil invariably has associated water that must be separated before the oil component can be efficiently refined into useful commercially acceptable products.

A common technique for improving the effectiveness of oil/water separation is by use of coalescence, a technique of joining together smaller water droplets into larger water droplets that may be more readily separated from the mixture. As water droplet size increases, the dynamics of gravitational separation improves. One method of augmenting coalescence of water droplets is by subjecting the mixture to an electric field. Oil, being a non-polar fluid, acts as a dielectric, and water droplets, being polar, when subjected to an electric field are coalesced. Electrostatic coalescence is usually practiced by establishing an electric field between electrodes and passing an oil-in-water mixture through the electric field. Since water is polar, water droplets become polarized by the electric field such that one side of the drop becomes electronegative while the opposite side becomes electropositive. Polarized droplets are thus attracted to each other with two drops coalescing into a larger drop upon contact. Larger water droplets tend to gravitate downwardly within the mixture, and the oil, having portions of the water removed therefrom, tends to gravitate upwardly within the mixture.

Much work has been done in the area of electrostatic coalescence of a mixture to augment separation of oil and water components. For example, U.S. Patent Application Publication No. 2013/0327646, incorporated herein by reference, describes an electrostatic coalescing oil/water separator and method. When large volumes of water have to be separated, there is a need for designing the separator such that water can be efficiently separated and removed without compromising the overall size of the separator.

BRIEF SUMMARY OF THE DISCLOSURE

It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from scope of the disclosure as set forth in the appended claims.

In an embodiment of the disclosure, an electrostatic separator includes a separator vessel having an oil collection portion at its upper end, a water collection portion at its lower end, at least one electrode generating an electric field, an inlet through which an emulsion mixture enters the separator vessel before exposure to the electric field in an upper part of the separator vessel, and at least one routing blade located proximate to the at least one electrode to route coalesced water droplets downwardly and away from the electric field.

BRIEF DESCRIPTION OF THE DRAWINGS

For a detailed description of the embodiments of the disclosure, reference will now be made to the accompanying drawings.

DETAILED DESCRIPTION

Figure 1:
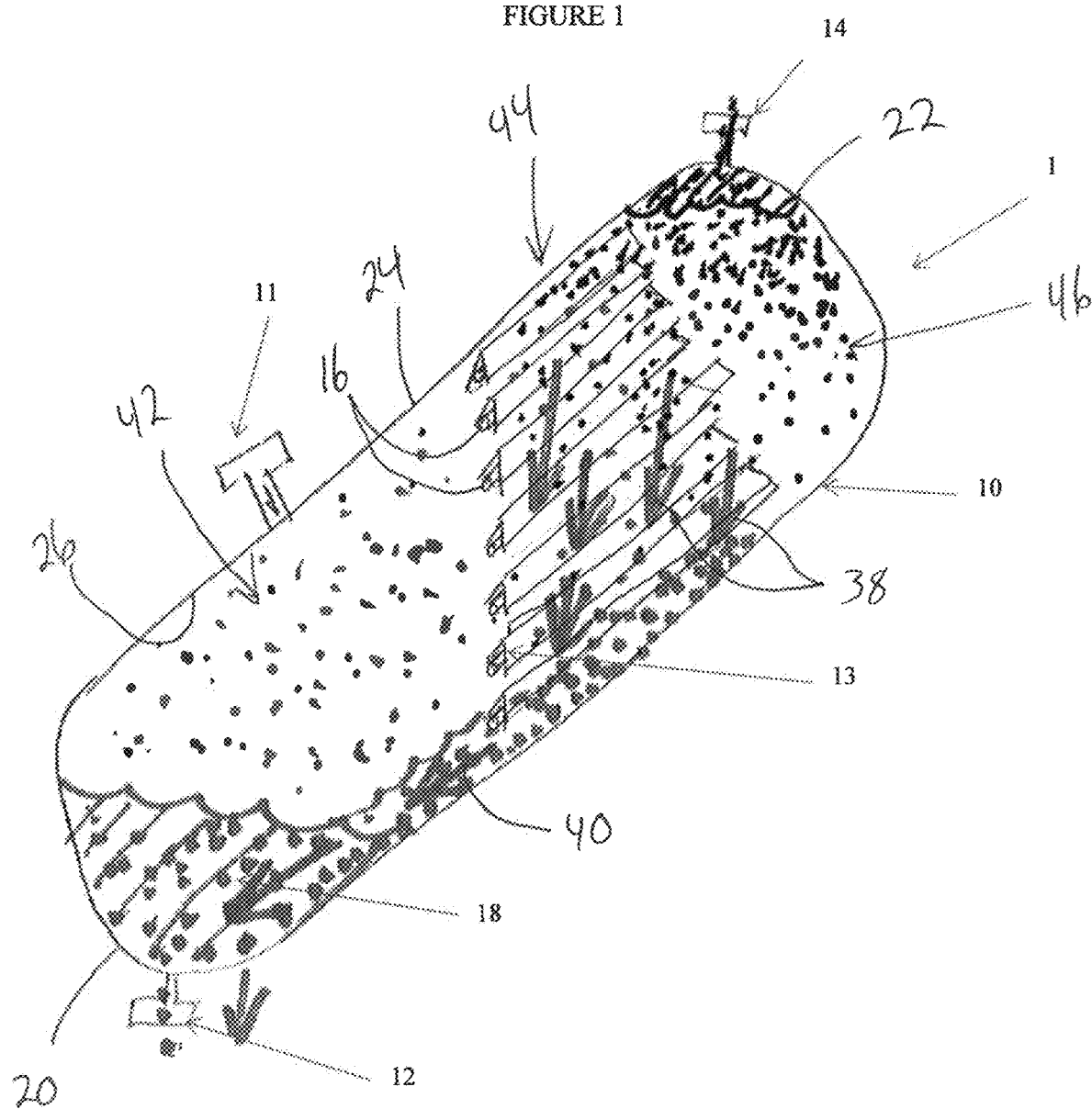
FIG. 1 shows a schematic view of an embodiment of an electrostatic separator of the disclosure.

The following discussion is directed to various embodiments of the present disclosure. However, one skilled in the art will understand that the embodiments disclosed herein have broad application, and that the discussion of any embodiment is not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and/or connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, a schematic view of an embodiment of an electrostatic separator system 1 is illustrated. The separator 1 includes an elongated vessel 10 having a fluid inlet 11, a lower end 20 including a first fluid outlet 12, and an upper end 22 including a second fluid outlet 14. The vessel 10 also includes an intermediate portion 24 and an inner chamber 26. Positioned within vessel 10 in chamber 26 is at least one electrode 16 that provides an electrostatic field through which inlet fluid flows. Positioned adjacent electrode 16 is a shroud or routing blade 13. In some embodiments, a plurality of electrodes 16 are positioned within chamber 26 along with adjacent routing blades 13.

Figure 2:
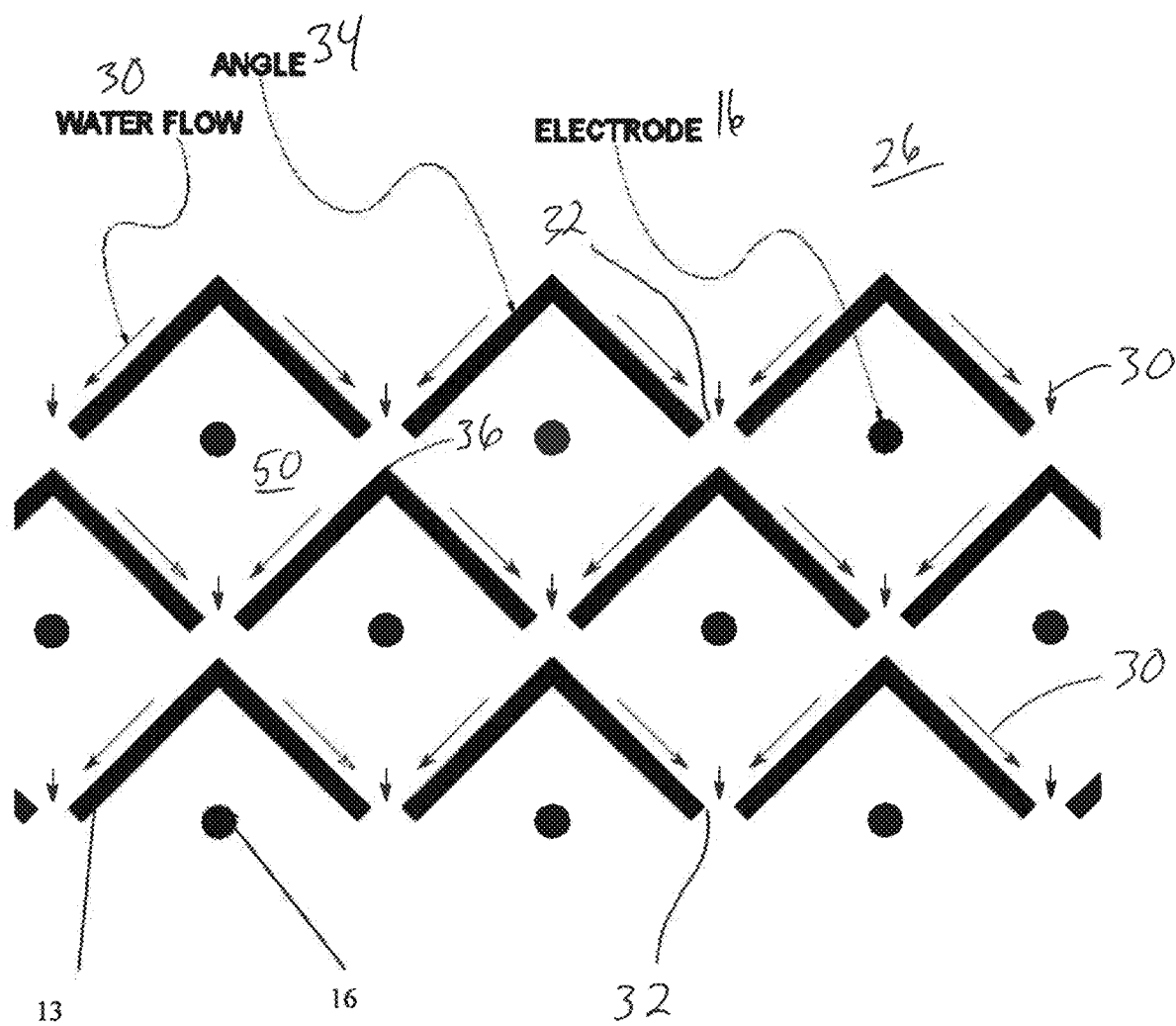
FIG. 2 shows an end view of an embodiment of routing blades in an electrostatic separator of the disclosure.

Referring now to FIG. 2, a plurality of electrodes 16 may be spaced apart or interspersed within chamber 26 of vessel 10 as shown. Routing blades 13 are disposed adjacent electrodes 16. Routing blades 13 include an angled top surface 34 with an apex 36. Adjacent routing blades 13 are separated by a gap or slot 32. The vessel 10 is made of a conductive material, for example metal, so that an electrostatic field can be established between electrode 16 and a wall of vessel 10. In some embodiments, at least one routing blade 13 is made of a conductive material, such as metal. Thus, within the vessel 10, an electrostatic field can be created by activating or initiating the at least one electrode 16 thereby causing an electrostatic field to extend between the at least one electrode 16 and the conductive vessel wall and/or the conductive routing blade 13. As the inlet fluid then passes through the electrostatic field, the water is coalesced.

Referring back to FIG. 1, a mixture of oil and water enters the separator system 1 via fluid inlet 11. The mixture flows into a mixture region or portion 42 and through the elongated vessel 10 including an electrode region or portion 44. In some embodiments, vessel 10 is downwardly sloped or angled as shown in FIG. 1. Sloping the vessel 10 helps allow a high liquid flux past the electrodes by operation of gravity. The sloped arrangement of vessel 10 thus enhances immediate gravity-assisted separation of the oil and water mixture after exposure to an electrostatic field generated by the electrode 16.

Separated water has a higher specific gravity than produced crude oil fluid, thus allowing gravity to drop larger water droplets out of the electrostatic field or working envelope. Within separation vessel 10 the mixture is offered an immediate opportunity to separate into heavier and lighter components. In some embodiments, the mixture includes an oil-in-water emulsion. In other embodiments, the mixture includes a water-in-oil emulsion, The heavier, water-based component separates from the mixture and flows downwardly within the sloped separation vessel 10 at arrow 40 into a water collection region or portion 18 below inlet 11. The water component flows out of vessel 10 through first fluid outlet 12. The lighter, oil-based component is carried upwardly into an oil collection region or portion 46 and then to the second fluid outlet 14. The oil component of the mixture entering the separator system 1, having at least a substantial portion of the water extracted therefrom, thus flows through second fluid outlet 14 of vessel 10 for transportation to a pipeline where it may be moved to a refinery, or is conveyed to a facility for storage or further processing.

While the electrostatic separator system 1 aids with separation of water from a water-oil mixture, scaling up of the technology for larger volume throughput might create difficulty with effective removal of the separated water. Thus, in embodiments disclosed herein, separated water is to be directed away from nearby electrostatic fields and out of the flow path of new mixtures and/or emulsions entering the electrostatic field through inlet 11. Referring to FIG. 2, details of an embodiment of a routing blade in an electrostatic separator of the present disclosure are illustrated as described above. In this embodiment, the vessel 10 includes the electrode region 44 having at least one routing blade 13 located proximate to one or more electrodes 16. In some embodiments, a plurality of routing blades 13 surround a plurality of electrodes 16. The routing blades 13 serve to route the oil-water mixture through a channel 50 wherein the oil-water mixture will be exposed to the electric field. In an embodiment, the routing blades 13 are arranged so that coalesced water droplets flow downwardly from the blades 13 toward the first fluid outlet 12 of the vessel 10, as represented by arrows 38 in FIG. 1. In some embodiments, the gaps or slots 32 enable a flow path 30 through the routing blades 13 for downward or vertical flow of the coalesced water droplets. Consequently, separated water disengages from the oil-water mixture and does not interfere with coalescing action inside the routing blade channels 50.

The geometry or shape of the routing blade 13 improves the water flow away from the electrostatic area, thus improving the efficiency and throughput of the separator system 1. In the embodiment of FIG. 2, a plurality of routing blades 13 are angled 'V' shaped plates in side-by-side and/or stacked configuration, including the angled surfaces 34 and the apex 36. The coalesced water droplets thus can accumulate and be channeled away from the main flow path. The angle blades can be oriented into the flow path or at an angle to the flow path for increased water removal efficiency. In some embodiments, the apexes 36 of adjacent rows of routing blades 13 are misaligned as shown in FIG. 2. Consequently, the flow path 30 is diverted at times away from a continuous downward vertical flow path. In some embodiments, the fluid in the flow path 30 cascades through the routing blades 13.

Figure 3:
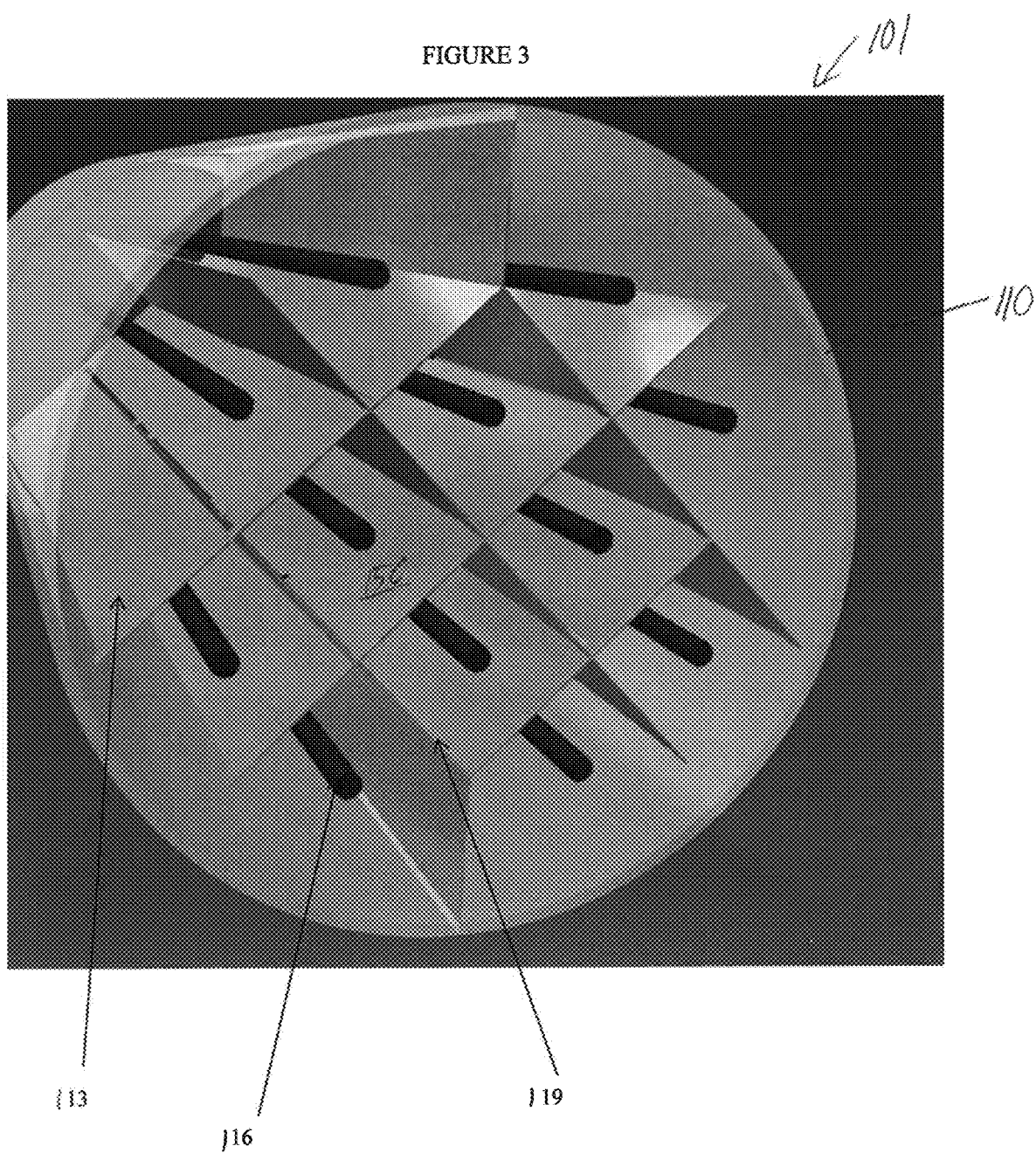
FIG. 3 shows a perspective view of another embodiment of routing blades in an electrostatic separator of the disclosure.
Figure 4:
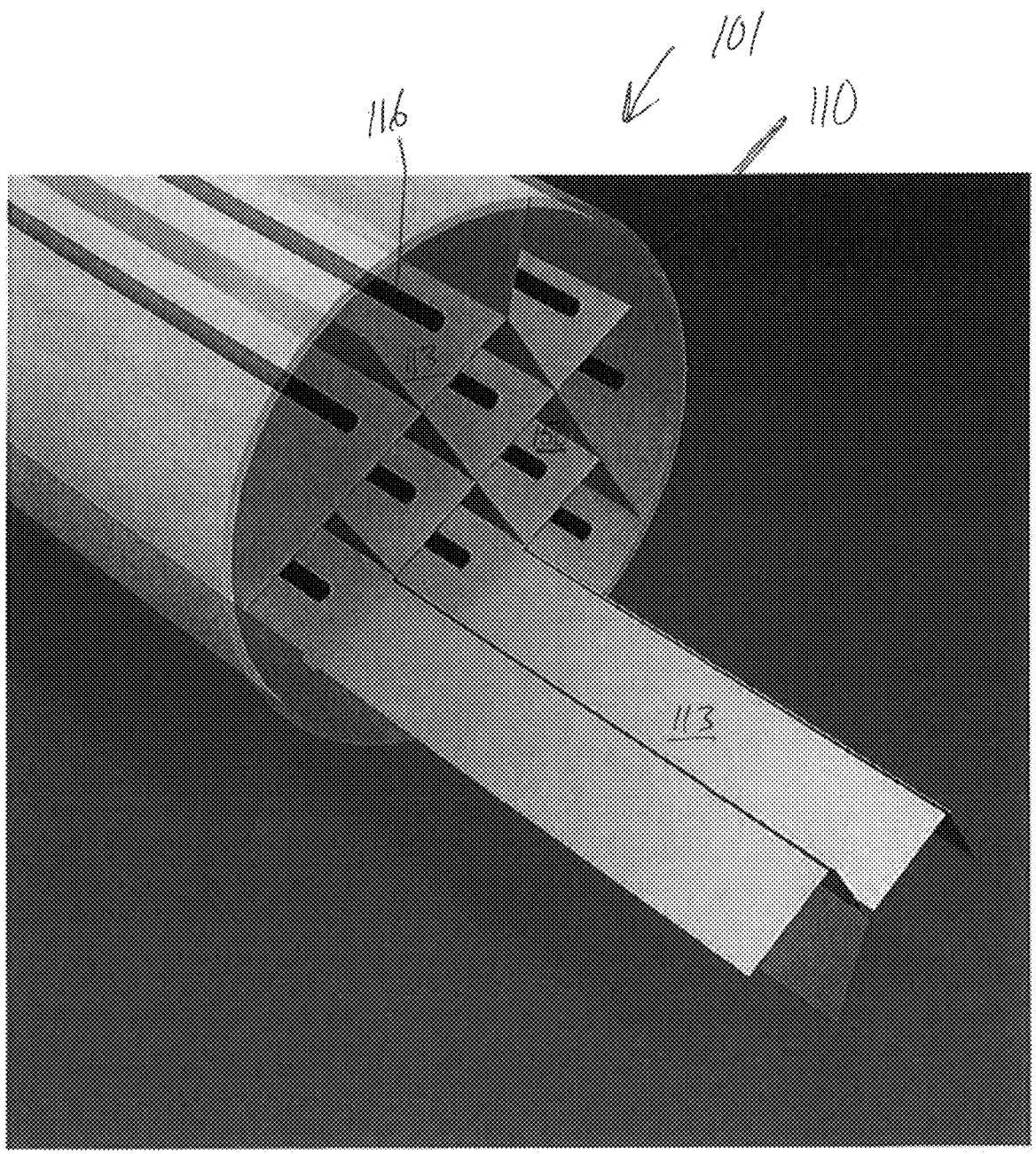
FIG. 4 shows another view of the embodiment of routing blades of FIG. 3.

Referring to FIGS. 3 and 4, another embodiment of a routing blade and electrode assembly is shown. In an electrostatic separator system 101, a vessel 110 includes routing blades 113 that are stacked on each other to form channels 150 with electrodes 116 extending therethrough. The routing blades include slots 119, thereby allowing the coalesced water droplets to fall therethrough. In some embodiments, the routing blades 113 form a honeycomb shape encompassing the electrodes 116, with the slots 119 formed therein to re-direct water coalescing in the channels 150. In some embodiments, the slots 119 are formed at or near the joints between the routing blades 113.

By effectively redirecting the separated water away from the electrostatic field through channels created by the routing blades, with water routing slots or gaps, the water is allowed to vertically drop through the slots or gaps and accumulate at the bottom of the vessel, where it is out of the electrostatic section. If vessel 10 is inclined, the accumulated water can further be directed to the lowest portion 18 of the inclined vessel and removed through fluid outlet 12. In some embodiments, a first flow path of the oil and water mixture enters the fluid inlet which can then be separated into a second flow path of mostly oil upward toward the fluid outlet 14 and a third flow path of water vertically downward along arrows 38 and along the vessel wall toward the water collection portion 18 and the fluid outlet 12. In some embodiments, the re-directed water along the third flow path minimizes interference with the first flow path.

While several embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An electrostatic separator comprising:
    a separator vessel;
    an oil collection portion at an upper end of the separator vessel;
    a water collection portion at a lower end of the separator vessel;
    at least one electrode in the separator vessel generating an electric field;
    an inlet through which an oil-water mixture enters the separator vessel before exposure to the electric field; and
    at least one routing blade comprising a pair of angled planar surfaces each extending from a terminal lower end thereof to an upper end thereof, wherein the upper ends of the angled planar surfaces form an apex that defines an upper end of the at least one routing blade, and the terminal lower ends of the angled planar surfaces define a terminal lower end of the at least one routing blade;
    wherein the at least one electrode extends through a channel formed by the at least one routing blade to route coalesced water droplets downwardly and away from the electric field.

2. The electrostatic separator of claim 1, wherein the at least one routing blade is a plurality of routing blades.

3. The electrostatic separator of claim 2, wherein the plurality of routing blades are side by side or stacked upon each other.

4. The electrostatic separator of claim 2, wherein the plurality of routing blades are separated by slots.

5. An electrostatic separator vessel comprising:
    an oil and water mixture inlet;
    a first fluid outlet;
    a second fluid outlet positioned at an upper end of the electrostatic separator vessel, wherein the second fluid outlet comprises an oil outlet for oil of an oil and water mixture received by the oil and water mixture inlet;
    a plurality of routing blades forming channels, wherein at least one routing blade of the plurality of routing blades comprises a pair of angled planar surfaces each extending from a terminal lower end thereof to an upper end thereof, wherein the upper ends of the angled planar surfaces form an apex that defines an upper end of the at least one routing blade, and the terminal lower ends of the angled planar surfaces define a terminal lower end of the at least one routing blade;
    a plurality of electrodes disposed in the channels to generate an electric field, wherein the separator vessel comprises a longitudinal axis extending between a first end of the separator vessel and a second end of the separator vessel opposite the first end, and wherein the plurality of electrodes are positioned axially between the first fluid outlet and the second fluid outlet; and
    wherein the plurality of routing blades are separated by slots to redirect water coalesced by the electric field from the channels.

6. The electrostatic separator vessel of claim 5, wherein the coalesced water is redirected downward through the routing blades from the channels.

7. The electrostatic separator of claim 5 further comprising a first flow path of the oil and water mixture toward the routing blades, a second flow path of the oil from the routing blades to the second fluid outlet, and a third flow path of coalesced water from the slots in the routing blades to the first fluid outlet.

8. An electrostatic separator vessel comprising:
    an oil and water mixture inlet;
    an oil collection portion at an upper end of the separator vessel;
    a water collection portion at a lower end of the separator vessel;
    a first fluid outlet;
    a second fluid outlet positioned at an upper end of the electrostatic separator vessel;
    a plurality of routing blades forming channels, wherein at least one routing blade of the plurality of routing blades comprises a pair of angled planar surfaces each extending from a terminal lower end thereof to an upper end thereof, wherein the upper ends of the angled planar surfaces form an apex that defines an upper end of the at least one routing blade, and the terminal lower ends of the angled planar surfaces define a terminal lower end of the at least one routing blade;
    a plurality of electrodes disposed in the channels to generate an electric field, wherein the separator vessel comprises a longitudinal axis extending between a first end of the separator vessel and a second end of the separator vessel opposite the first end, and wherein the plurality of electrodes are positioned axially between the first fluid outlet and the second fluid outlet; and
    wherein the plurality of routing blades are separated by slots to redirect water coalesced by the electric field from the channels.

9. The electrostatic separator vessel of claim 8, wherein the coalesced water is redirected downward through the routing blades from the channels.

10. The electrostatic separator vessel of claim 8, further comprising a first flow path of the oil and water mixture toward the routing blades, a second flow path of oil from the routing blades to the second fluid outlet, and a third flow path of coalesced water from the slots in the routing blades to the first fluid outlet.

11. The electrostatic separator vessel of claim 5, wherein the first fluid outlet is positioned at the first end of the separator vessel and the second fluid outlet is positioned at the second end of the separator vessel.

12. The electrostatic separator vessel of claim 5, wherein the oil and water mixture inlet is positioned axially between the first fluid outlet and the second fluid outlet.

13. The electrostatic separator vessel of claim 8, wherein the first fluid outlet is positioned at the first end of the separator vessel and the second fluid outlet is positioned at the second end of the separator vessel.

14. The electrostatic separator vessel of claim 13, wherein the oil and water mixture inlet is positioned axially between the first fluid outlet and the second fluid outlet.

* * * * *